(12) United States Patent
Shelton et al.

(10) Patent No.: US 8,156,663 B2
(45) Date of Patent: Apr. 17, 2012

(54) SHOE SOLE AND METHOD

(75) Inventors: Duane Shelton, Bourbon, MO (US);
Brian D. O'Connor, St. Louis, MO (US); Daniel M. Doerer, Town & Country, MO (US)

(73) Assignee: Brown Shoe Company, Inc., St. Louis, MO (US)

( * ) Notice: Subject to any disclaimer, the term of this patent is extended or adjusted under 35 U.S.C. 154(b) by 476 days.

(21) Appl. No.: 12/420,031

(22) Filed: Apr. 7, 2009

(65) Prior Publication Data
US 2009/0249656 A1 Oct. 8, 2009

Related U.S. Application Data

(60) Provisional application No. 61/043,184, filed on Apr. 8, 2008, provisional application No. 61/051,708, filed on May 9, 2008, provisional application No. 61/108,926, filed on Oct. 28, 2008.

(51) Int. Cl.
*A43B 5/00* (2006.01)
*A43B 5/10* (2006.01)
*A43B 13/00* (2006.01)
*A43B 13/02* (2006.01)
*A43B 13/04* (2006.01)
*A43B 13/12* (2006.01)
*A43B 13/14* (2006.01)
*A43B 13/18* (2006.01)
*A43B 13/22* (2006.01)

(52) U.S. Cl. .............. 36/25 R; 36/30 R; 36/31; 36/32 R; 36/103

(58) Field of Classification Search .................. 36/25 R, 36/103, 26, 30 R, 31, 32 R; 12/146 B, 136 BR, 12/142 RS, 142 T
See application file for complete search history.

(56) References Cited

U.S. PATENT DOCUMENTS

| 3,589,036 A * | 6/1971 | Hendricks et al. ........ 36/32 R X |
| 4,011,130 A | 3/1977 | Worden |
| 4,041,620 A | 8/1977 | Anderson |
| 5,254,405 A * | 10/1993 | Panaroni et al. .......... 36/25 R X |
| 5,346,934 A | 9/1994 | Chriss |
| 5,586,354 A * | 12/1996 | Chi ........................... 12/146 BR |
| 6,098,313 A * | 8/2000 | Skaja ........................ 36/30 R X |
| 7,874,084 B2 * | 1/2011 | Earle et al. ................ 36/32 R X |
| 2004/0148803 A1* | 8/2004 | Grove et al. .................... 36/103 |
| 2004/0244223 A1* | 12/2004 | Watkins .................... 36/30 R X |
| 2005/0011085 A1* | 1/2005 | Swigart et al. .................... 36/31 |
| 2008/0168684 A1* | 7/2008 | Khalifa ........................ 36/103 X |
| 2010/0293814 A1* | 11/2010 | Skaja et al. .................... 36/25 R |

FOREIGN PATENT DOCUMENTS

GB 1361540 A 7/1974
WO 2006034807 A1 4/2006

* cited by examiner

*Primary Examiner* — Rodney B White
(74) *Attorney, Agent, or Firm* — Husch Blackwell LLP

(57) ABSTRACT

A shoe outsole and method of manufacture wherein the outsole, or various components thereof such as various inserts and/or additional layers associated with a particular outsole, are formed using various scrap materials generated during the shoe manufacturing process such as leather, leather dust, jute, and other fibrous material, the scrap materials being used as a filler material and being mixed with various elastomeric materials to form the shoe outsole and various components thereof. The outsole can be formed as a substantially one-piece unit, or it can be formed as a base sole layer having one or more additional layers associated therewith including inserts associated with the forefoot and heel regions of the outsole.

24 Claims, 3 Drawing Sheets

SHOE SOLE AND METHOD

CROSS-REFERENCE TO RELATED APPLICATION

This application claims the benefit of and priority to U.S. Provisional Patent Applications Ser. No. 61/043,184, filed Apr. 8, 2008, entitled SHOE SOLE AND METHOD; Ser. No. 61/051,708, filed May 9, 2008, entitled SHOE WITH OUTSOLE INSERT; and Ser. No. 61/108,926, filed Oct. 28, 2008, which applications are hereby incorporated by reference to the extent permitted by law.

BACKGROUND OF THE INVENTION

The present invention relates generally to the construction of a shoe and the manufacture thereof and, more particularly, to the construction of a shoe having an outsole and/or components thereof comprised of recycled materials, such as leather or jute, generated during the shoe manufacturing process.

The shoe industry is faced with many issues. One of these issues is cost control while maintaining product quality. One cost issue is directed to the disposal of scrap materials from the shoe making process, particularly leather scrap. Another issue is the manufacture of quality shoe outsoles while controlling the cost thereof. As the price of hydrocarbons increases, materials made from crude oil increases, including the cost of producing many types of elastomers used in outsoles.

During the manufacture of shoes, various materials such as synthetic and natural rubber, thermoplastics and thermosetting or cured plastics and leather materials are cut into a desired shape to fit a particular pattern or design. As a result of the cutting process, portions of these materials are discarded as scrap. Currently, the trimmings are a stream of scrap material that must be disposed of. Today, the scrap leather is disposed of in landfills since there is no current use for it, particularly the grindings. The disposal of waste in landfills can be expensive.

In the manufacture of shoes, it is also common to use leather to form parts of the shoes including both uppers and outsoles. In the processing of the leather, relatively large quantities of leather dust are produced. Leather is a fibrous collagen material and is both durable, aesthetically pleasing and wear resistant. However, during the cutting and trimming process of leather, leather dust is produced. The leather dust is a waste material that then needs to be disposed of, which usually results in a further cost to the manufacturer.

The outsole of a shoe can be formed in a wide variety of different constructions. For example, the outsole can be formed as a substantially one-piece unit, or it can be formed as a base sole layer having one or more additional layers associated therewith to provide an outer ground engaging surface for the shoe. Still further, various portions of the outsole can be comprised of inserts associated with the forefoot and heel regions of a particular shoe.

It would be desirable to utilize the scrap materials generated during the shoe manufacturing process as fillers for addition to the elastomeric material used in outsoles to control cost while maintaining the functionality and appearance of the outsole.

It would also be desirable to provide a shoe outsole and method of making the shoe outsole that reduces the cost of the outsole by utilizing scrap material generated during the shoe making process, or other inexpensive material, as a filler without adversely affecting the quality or appearance of the outsole and, in fact, enhancing the quality and appearance.

It would also be desirable to utilize the leather dust generated during the shoe manufacturing process as a manufacturing material rather than dispose of it as a waste material. As the price of raw materials increases, the ability to use a material that is currently a waste material in place of costly raw materials would be desirable.

Thus, it would be desirable to provide a shoe outsole and method of making the outsole, including making various portions thereof including inserts and other additional layers associated with a particular outsole, from the scrap materials generated during the shoe making process including scrap leather, leather dust, jute, and other inexpensive filler materials, which would reduce the overall costs of manufacturing the outsole or various components thereof without adversely affecting the quality or appearance of the outsole.

SUMMARY OF THE INVENTION

The present invention is directed to the use of recycled material, such as leather or jute, generated during the manufacture of shoes. The shoe includes an upper, a midsole and an outsole. The midsoles and outsoles typically comprise a combination of synthetic and natural rubber, thermoplastics and thermosetting or otherwise cured plastics, and leather materials. The outsole is secured to the upper or midsole such as by cementing and/or stitching and has a bottom surface portion with a heel region and a forefoot region.

In one aspect of the present invention, a method of making a shoe outsole using a naturally occurring fibrous material as fillers is disclosed. The fibrous material is added in bulk to an elastomer to form a filled elastomer. The filled elastomer is then formed into an outsole for a shoe. The outsole is then attached to a shoe upper to form a shoe. The present invention also involves the provision of an outsole for a shoe comprising an elastomer and a bulk naturally occurring fibrous filler material. The filled and molded outsole is attached to a shoe upper.

In another aspect of the present invention, the fibrous material is applied to an elastomeric outsole precursor to form a finished outsole. The finished outsole is then attached to a shoe upper to form a shoe. The formed outsole is attached to a shoe upper.

In a further aspect of the present invention, an insert is provided and is secured to the outsole in at least one of the heel region and forefoot region. The insert includes at least one of a thermosetting material and a thermoplastic material and is of a molded construction. The insert includes a fibrous leather material as a filler with the filler being present in the range of between about 25% and about 75% by weight of the insert. The filler is located within the insert to provide engagement with the ground during use of the shoe. The present invention also involves the provision of a method of making a shoe. The method includes forming a shoe upper and a shoe outsole. The outsole is formed with the outsole having a forefoot region and a heel region. An insert is formed by molding of at least one of a thermosetting and a thermoplastic material including fibrous material as a filler. The insert has at least one surface portion with the fibrous filler being exposed thereon for engagement with the ground. The insert is attached to the outsole to form a ground engaging portion positioned in at least one of the forefoot region and the heel region of the outsole. The outsole is attached to the upper in a manner that exposes the at least one surface portion of the insert.

Specific advantages and features of the present system will be apparent from the accompanying drawings and the description of several illustrative embodiments of the present invention.

It should be understood that the drawings are not necessarily to scale and that the embodiments disclosed herein are sometimes illustrated by fragmentary views. In certain instances, details which are not necessary for an understanding of the present invention or which render other details difficult to perceive may have been omitted. It should also be understood that the invention is not necessarily limited to the particular embodiments illustrated herein. Like numbers utilized throughout the various figures designate like or similar parts or structure.

DETAILED DESCRIPTION

Figure 1:
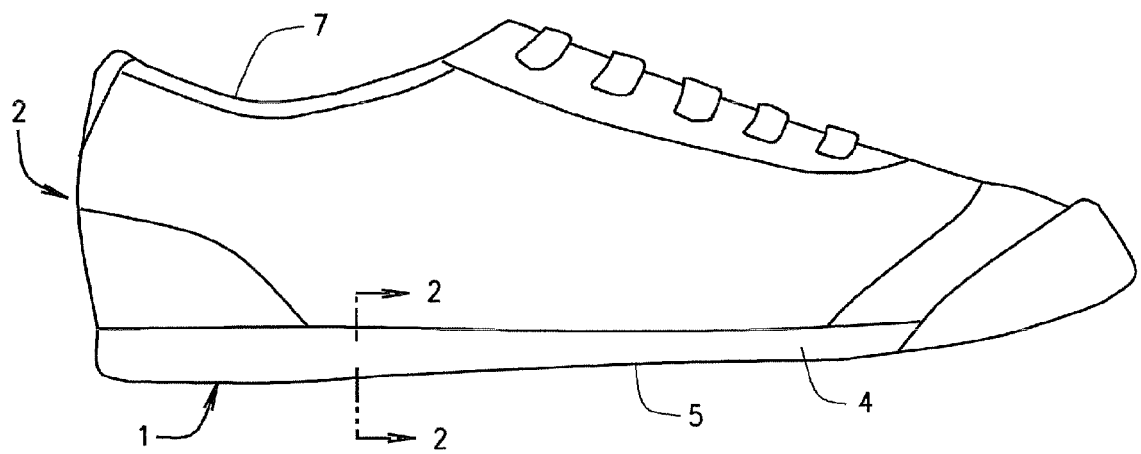
FIG. 1 is a side elevational view of one embodiment of a shoe with an outsole constructed in accordance with the teachings of the present invention.
Figure 2:
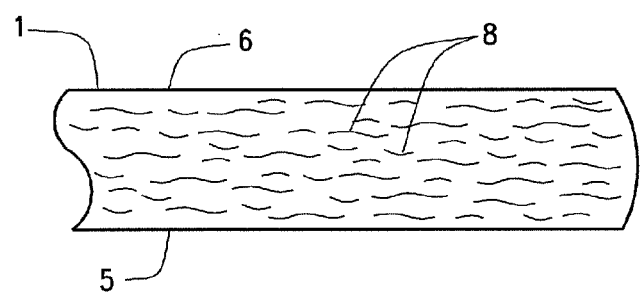
FIG. 2 is a fragmentary cross-sectional view of the present outsole taken along line 2-2 of FIG. 1.

As illustrated in FIG. 1, the present invention provides a shoe 2 generally comprising a shoe upper 7, a midsole (not shown) and an outsole 1. The outsole 1 has an outer perimeter, a portion of which is noted as 4, a bottom surface 5 and a top surface 6 to which the shoe upper 7 is secured. The outsole 1 is made of an elastomer material that can be either of a thermosetting or thermoplastic type. Such materials are well known in the art of shoe soles and can include, but are not limited to, elastomers such as polyvinyl chloride and styrene block copolymers (thermoplastics) and cast polyurethane and vulcanized rubber (thermosets).

The outsole 1 includes fibrous filler material 8 that is derived from naturally occurring fibrous material that are recycled from the shoe manufacturing process. The two preferred materials are leather and jute. Leather dust contains fibrous collagen in the form of a powder. Another suitable fibrous material is jute. Jute is a long, soft, shiny vegetable fiber that can be spun into coarse, strong threads. Jute is used chiefly to make the shoe upper. Jute is the most environmental friendly fiber starting from seed to the expired fiber, as the expired fibers can be recycled more than once. In a preferred embodiment, the filler material such as leather, leather dust, or jute is in fine particles or fiber form which can result from grinding small pieces of the scrap material, or such fibers may be taken directly from the scrap stream produced from the leather cutting/processing process. Preferably, the fibers, in some applications, can be up to about one-quarter inch in length.

Filler 8 is added to the elastomer in a weight range of between about 33% and about 300% by weight of the elastomer. The resulting mixture of elastomer and filler contains filler in the range of between about 25% and about 75% by total weight of elastomer and filler on a dry weight basis. Other materials can be added to the elastomer or elastomer/filler mixture. For example, carbon black, colorants or other suitable materials as are known in the art. In the use of the above-described naturally occurring fibrous material as filler 8, the addition of filler reduces the amount of elastomer needed to form an outsole, thus reducing the cost of producing an outsole while maintaining functionality and appearance. The use of the present invention can also eliminate disposing of scrap material from the shoe making process in a landfill.

A suitable elastomer is provided in bulk. It is then mixed preferably in a suitable mixer with the fibrous material. The filler material is added to the elastomer material prior to its being formed into an outsole, preferably in bulk form and mixed with the elastomer. Most of such filler material is generated during the manufacture of shoes. In one embodiment, the recycled leather material collected from the shoe manufacturing process is ground and/or pulverized in a conventional grinding and pulverizing apparatus to achieve the desired particle size. The recycled materials are then mixed with polyurethane, thermoplastics or rubber (synthetic or natural) for use in the manufacture of a shoe outsole. The recycled materials are mixed with the plastic or rubber formulation in a Banbury® or suitable mixer for mixing or compounding plastics and interspersing reinforcing fillers. In one embodiment, the mixed materials are passed through a roller mill to add colorants and other processing materials, and then it is passed through an injection molding, compression molding, transfer molding or other similar process. The mixed and milled materials are molded into an outsole.

In the case of forming an outsole from a thermosetting material, the filled and mixed elastomer can be subdivided into pills of formed material each having a predetermined weight. The pills are then each added to a compression mold and the outsole is formed by applying force to the pill to make the material flow in and fill the mold cavity. Curing or vulcanization of the material can be accomplished in the mold during the molding process or a formed outsole precursor can be removed and vulcanized in a suitable heated environment as for example, a curing furnace. A combination of such curing steps could also be used.

If a thermoplastic elastomer is used, one suitable method of forming an outsole is to injection mold the outsole. Compression molding can also be used. The mixture of elastomer and filler can be extruded into rods or ribbons and then cut into pellet form. The mixture could also be added in bulk to an extruder. The formed pellets can be added to the hopper of the extruder as a feed material. The filled elastomer material can then be heated in the extruder to a flowable temperature and injected, as is well known in the art, into a mold cavity to form the outsole 1. An injection mold is typically cooled or maintained at a temperature below the melting temperature of the thermoplastic elastomer, allowing the outsole to set or solidify in its as-molded form, removed from the mold and then processed into finished shoes by securing the molded outsole 1 to a shoe upper 7 as with cement and/or stitching to form the shoe 2.

FIGS. 3-6 illustrate another embodiment of the present invention. The present invention provides an outsole 1 made from various materials. Such materials are well known in the art of shoe manufacturing and can include, but are not limited to, TPR, PVC, rubber and EVA. The outsole 1 has an outer perimeter, a portion of which is denoted as 4, and a base layer 9 having a bottom surface 5 and a top surface 6 to which a shoe upper 7 is secured. The base layer 9 can be made of a synthetic material such as an elastomer that can be either of a thermosetting or thermoplastic type and provides an outsole precursor for manufacture of the outsole 1 by the addition of one or more additional layers thereto as described below. Such materials are well known in the art of shoe soles and can include, but are not limited to, elastomers such as polyvinyl chloride and styrene block copolymers (thermoplastics) and cast polyurethane and vulcanized rubber (thermosets).

Figure 3:
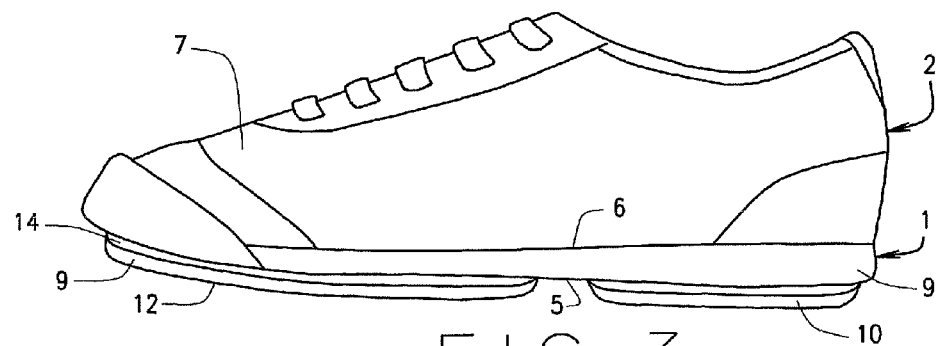
FIG. 3 is a side elevational view of another embodiment of a shoe with an outsole constructed in accordance with the teachings of the present invention.
Figure 4:
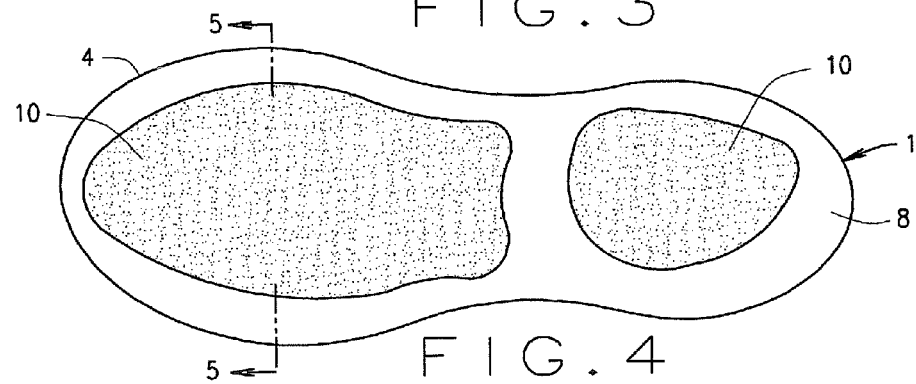
FIG. 4 is a bottom plan view of the outsole of FIG. 3.
Figure 5:
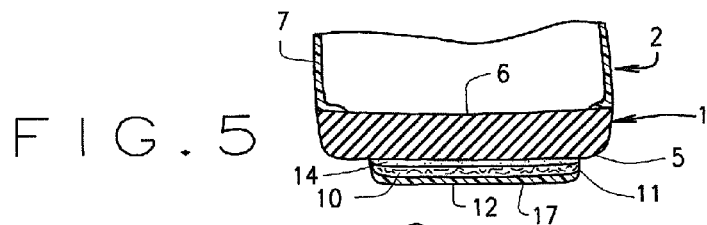
FIG. 5 is a cross-sectional view of the present outsole taken along line 5-5 of FIG. 4.
Figure 6:
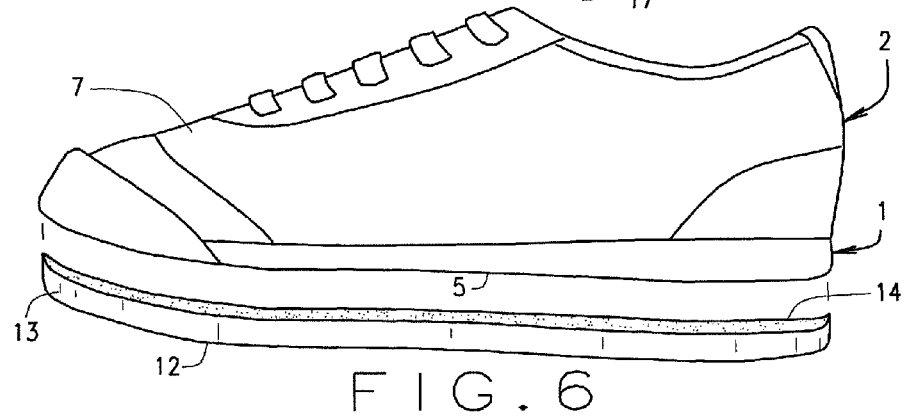
FIG. 6 is an exploded view of another embodiment of an outsole constructed in accordance with the teachings of the present invention.

The outsole 1 in FIGS. 3-6, in one embodiment, also includes an outer sole layer 10 that includes fibrous material 11 (FIG. 5) that is derived from naturally occurring fibrous material. The preferred fibrous material is leather dust. Leather dust contains fibrous collagen in the form of fine particles including short fibers and/or a powder. Another suitable fibrous material is jute. The fibrous material containing layer 10 is applied to the base layer 9 after it is formed providing an outer ground engaging surface 12. The fibrous material 11 can be applied in bulk form to a binder material such as an applied adhesive 14 (FIGS. 3, 5). The fibrous material 11 may also be provided, in a second embodiment, in a formed separate layer 13 (FIG. 6) including binder and fibrous material 11. In a preferred embodiment, the fibrous material is in fine particles or fiber form which can result from grinding small pieces of scrap leather or taken as a scrap stream from the leather cutting/processing process. Preferably, the fibers are up to about one-quarter inch in length.

Fibrous material 11 is added to the binder material in a weight range of between about 25% and about 75% by weight of layer 10, 13 and preferably at least about 50% by total weight on a dry weight basis. Preferably, the outer layers 10, 13 cover at least about 50% of the bottom surface area of the outsole 1. As seen in FIGS. 3, 4, the outsole 1 includes two separate layers 9, one in the forefoot area and one in the heel area. Any suitable number of such areas with a layer 10 can be provided. Other materials can be added to either layer 10, 13. For example, carbon black, colorants or other suitable materials as are known in the art. In the use of the above-described naturally occurring fibrous material 11, the addition of fibers reduces the amount of elastomer or other materials used to form an outsole, thus reducing the cost of producing an outsole while maintaining functionality and appearance. The use of the present invention can also eliminate or reduce disposing of scrap material from the shoe making process in a landfill.

The elastomer material can then be heated in the extruder to a flowable temperature and injected, as is well known in the art, into a mold cavity to form the base layer 9 of outsole 1. Fibrous material, as described above, could be added to form the base layer 9. An injection mold is typically cooled or maintained at a temperature below the melting temperature of the thermoplastic elastomer, allowing the base layer 9 to set or solidify in its as-molded form, removed from the mold and then processed into finished shoes by applying the layers 10 or 13 to the base layer 9 to form outsole 1. The outsole 1 is then secured to a shoe upper as with cement and/or stitching to form the shoe 2.

The layers 13 and 10 can be formed and applied as separate discrete layers 13 or formed on the bottom surface 5 of base layer 9 as layer 10 and when applied provides an outer ground engaging surface 12. When applied as a discrete layer (FIG. 6) the layer 13 can be formed by molding using a binder such as thermoplastic resin or adhesive to bond the fibers 11 together. The layer 13 could be also formed as a sheet and die cut to shape. The thus formed layer 13 can be joined to the base layer 9 on the outer surface 5 as with a cement or adhesive 14. The layer 13 may also be molded, as by injection molding, onto the outer surface 5. Alternately, cement or adhesive 14, such as an air dry cement or a solvent cured urethane cement, may be applied over substantially the entire bottom surface 5 of the base layer 9 or in any suitable pattern, FIG. 4, using a mask and then apply the fibrous material 11 to the applied cement 14 to form one or more areas of layer 10. The fibrous material 11 may be spray applied to the adhesive 14 but is preferably not applied electrostatically. The applied fibrous material 11 may be pressed after application to assist in bonding to the binder cement 14 and layer 9. Unbonded fibrous material 11 may be suitably removed as by shaking or vacuuming. Once the fibrous material 11 is applied, an encapsulating material 17 (FIG. 5) can be optionally applied to form the ground engaging surface 12.

Figure 7:
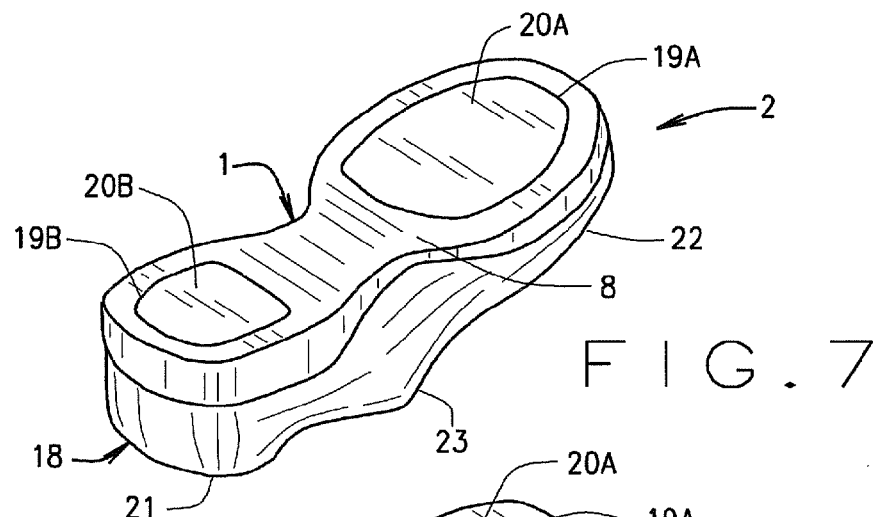
FIG. 7 is an perspective view of another embodiment of a shoe with an outsole constructed in accordance with the teachings of the present invention.
Figure 8:
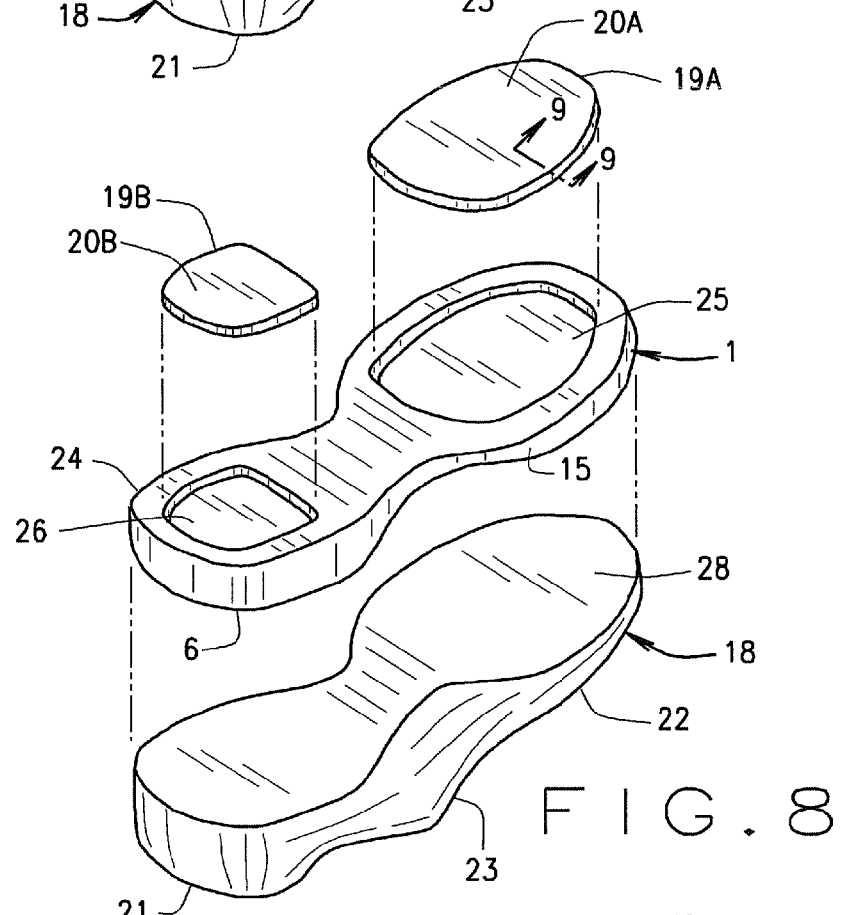
FIG. 8 is an exploded perspective view of the shoe illustrated in FIG. 7.
Figure 9:
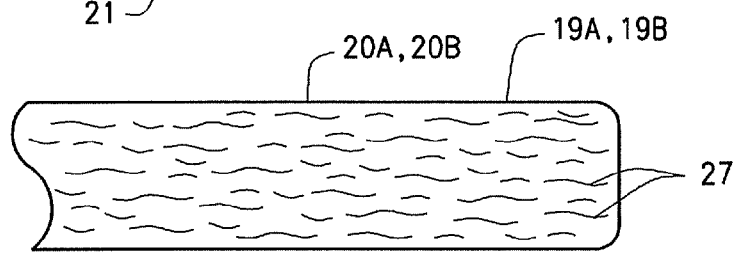
FIG. 9 is an enlarged cross-sectional view of a portion of the present insert taken along line 9-9 of FIG. 8.

FIGS. 7-9 illustrate another embodiment of the present invention. The upper 18 may be any suitable upper including a fully enclosed upper such as for a low cut shoe or a boot, a sandal upper or even a thong-type upper which provides means for mounting the shoe 2 to the foot of a user. An outsole 1 is provided and is connected to the upper 18 in any suitable manner. In a typical shoe, the outsole 1 is attached to the upper by cementing and/or stitching depending upon the end shoe to be produced. The term shoe will be used herein to denote both standard low cut shoes and boot-type footwear, sandals, thongs and the like. In a typical shoe construction, the upper 18 has a bottom surface 28 and the outsole 1 has a top surface 6 that at least partially engage one another when the upper 18 is joined to the outsole 1. At least one insert 19A, 19B is provided for attachment to the outsole 1 to provide a walking or ground engaging surface portion 20A, 20B when the shoe is used.

The upper 18 can be of any suitable type, for example, an athletic shoe, a dress shoe, a boot, a sandal or even a thong. The construction of the upper 18 will be determined by the type of shoe to be made. As illustrated, the upper 18 has a heel portion 21, a forefoot portion 22 and a vamp portion 23. The vamp portion 23 may be provided with means for tightening the shoe 2 to a user's foot, for example, a lace and eyelets.

The outsole 1 may be of any suitable construction and is preferably of a molded construction using either a thermosetting or a thermoplastic material such as polyvinyl chloride and styrene block copolymers (thermoplastics) and cast polyurethane and vulcanized rubber (thermosets). A molded construction provides a finished outsole that eliminates the need for grinding of the edges or other outsole portions to substantially complete the outsole.

The outsole 1 has a bottom surface 20A, 20B that is provided with one or more inserts 19A, 19B. In the illustrated structure, two inserts 19A, 19B are provided. A first insert 19A is in underlying relation to the outsole 1 in the forefoot region 15 of the outsole 1 and in particular under the ball of the foot of a user of the shoe. The second insert 19B is positioned in the heel region 24 of the outsole 1 and underlies the heel of a user of the shoe 2. The inserts 19A, 19B are preferably of a molded construction and include at least one of a thermosetting or thermoplastic material as described above. The inserts 19A, 19B are suitably secured to the outsole 1 to provide ground engaging surfaces 20A, 20B. In a preferred embodiment, the inserts 19A, 19B are each received in a respective recess or pocket 25, 26 and suitably attached to the outsole 1. The attachment may be cementing as is known in the art. The inserts 19A, 19B could also be heat fused into place if desired. It is to be understood however, that the inserts 19A, 19B may also be secured to the outsole 1 and project therefrom and not be secured in a recess 25, 26.

Each insert 19A, 19B, is preferably of a molded construction and contains fibrous leather material 27 in particulate form which can be leather scrap material generated by grinding or cutting of the scrap leather to form parts of shoes. The resulting mixture of elastomer and filler has filler in the range of between about 25% and about 75% by total weight of elastomer and filler on a dry weight basis. Other materials can be added to the elastomer/filler mixture, for example, carbon black, colorants or other suitable material as are known in the art.

An injection mold is typically cooled or maintained at a temperature below the melting temperature of the thermoplastic material, allowing the insert to set or solidify in its as-molded form, removed from the mold and then processed into a finished shoe by securing the outsole 1 to the upper 18. The material extruded could be formed to shape by a die and the extrudate cut the proper thickness. The formed insert 19A, 19B is then secured to the outsole 1 before or after the outsole is attached to the upper 18. The securement of the outsole 1 to the upper 18 and an insert 19A, 19B to the outsole 1 can be by cementing.

In a preferred embodiment, fibers are up to about ¼" in length. In another embodiment, the fibers may be added to the mold cavity and the elastomer may be molded in the thus partially prefilled cavity allowing the elastomer to flow into and fill spaces between the fibers. This method can be used to form a layered insert 19A, 19B. The fibers 27 could be preferentially disbursed adjacent to a surface 20A, 20B of a respective insert 19A, 19B.

As a result, it is recognized and anticipated that either the entire outsole of a shoe, or various components of an outsole such as various inserts and/or additional layers associated with a particular outsole as a ground engaging surface, can be formed using various scrap materials produced during the manufacturing of a shoe such as leather, leather dust, jute, and other inexpensive materials which can be mixed and blended as a filler material used in combination with the various elastomeric materials used to form shoe outsoles and various components thereof. Such mixed elastomeric material can then be processed via a wide variety of different processing means such as injection molding, compression molding, extruding, or any other suitable method for fabricating the outsole or various components thereof. It is likewise recognized and anticipated that other inexpensive filler material may likewise be utilized to fabricate such shoe components so long as the equality and appearance of the outsole are not adversely affected.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method of making a shoe outsole comprising the steps of:
    providing naturally occurring fibrous material, said fibrous material being at least one of leather and jute;
    adding the fibrous material to an elastomer to form a filled elastomer; and
    forming the thus filled elastomer into an outsole.

2. The method of claim 1 wherein the fibrous material is scrap materials recycled from the shoe making process.

3. The method of claim 1 wherein the fibrous material is a leather which contains fibrous collagen in the form of a powder.

4. The method of claim 1 wherein the fibrous material is leather dust generated during the shoe making process.

5. A molded shoe outsole comprising:
    an elastomer; and
    a fibrous filler material mixed in the elastomer in the range of between about 25% and 75% by weight of elastomer and filler, said filler including at least one of leather and jute.

6. The molded shoe outsole of claim 5 wherein the fibrous material is scrap materials recycled from the shoe making process.

7. The molded shoe outsole of claim 5 wherein the fibrous material is a leather which contains fibrous collagen in the form of a powder.

8. The molded shoe outsole of claim 5 wherein the fibrous material is at least one of leather and jute.

9. A method of forming a shoe outsole, comprising the steps of:
    forming a first outsole layer; and
    applying a second outsole layer containing scrap materials recycled from the shoe making process to the first layer wherein the first and second layers are bonded together, said scrap materials including at least one of leather and jute, said second layer when applied being shaped to provide an outer surface.

10. The method of claim 9 including applying adhesive to the first layer and wherein the scrap materials are applied to the adhesive to form the second layer.

11. The method of claim 9 wherein the second layer is a discreet formed layer prior to application to the first layer.

12. The method of claim 9 wherein the scrap materials recycled from the shoe making process includes leather dust.

13. A shoe outsole comprising:
    a first layer formed of a synthetic material with first and second main surfaces; and
    a second layer including scrap materials recycled from the shoe making process bonded to the first surface of the first layer, said scrap materials including at least one of leather and jute, said second layer being shaped to provide an outer surface for a shoe.

14. The shoe outsole of claim 13 wherein the second layer includes cement bonded to the first layer and the scrap materials are bonded to the cement.

15. The shoe outsole of claim 13 wherein the second layer is a composite of leather dust and binder, the second layer being bonded to the first layer.

16. The shoe outsole of claim 13 wherein the second layer covers at least about 50% of the area of the first surface.

17. The shoe outsole of claim 13 wherein the scrap materials recycled from the shoe making process includes leather dust.

18. A shoe comprising:
    an upper;

an outsole, said outsole being secured to the upper and having a bottom surface portion with a heel region and a forefoot region; and an insert secured to the outsole in at least one of the heel region and the forefoot region, said insert including at least one of a thermoset and a thermoplastic material and being of a molded construction, said insert also including scrap materials recycled from the shoe making process as a filler within the range of between about 25% and about 75% by total weight of the insert, said scrap materials including at least one of leather and jute.

19. The shoe of claim 18 wherein said insert is positioned in a recess formed in the outsole.

20. The molded shoe outsole of claim 18 wherein the scrap materials recycled from the shoe making process includes fibrous leather material.

21. The molded shoe outsole of claim 18 wherein the scrap materials recycled from the shoe making process includes leather dust.

22. A method of making a shoe comprising the steps of:
forming a shoe upper;
forming an outsole, said outsole having a forefoot portion and a heel portion;
forming an insert by molding at least one of a thermoset and a thermoplastic material with scrap materials recycled from the shoe making process as filler with at least one surface portion having the filler exposed thereon, said scrap materials including at least one of leather and jute;
attaching the insert to the outsole to form a ground engaging portion; and
attaching the outsole to the upper so as to expose said at least one surface portion.

23. The molded shoe outsole of claim 22 wherein the scrap materials recycled from the shoe making process includes leather dust.

24. The molded shoe outsole of claim 22 wherein the leather material is a leather which contains fibrous collagen in the form of a powder.

* * * * *